(12) United States Patent
Lin

(10) Patent No.: US 7,395,722 B2
(45) Date of Patent: Jul. 8, 2008

(54) MECHANICAL PROPERTY MEASUREMENT OF THIN FILMS BY MICRO PLANE-STRAIN COMPRESSION

(75) Inventor: Li Lin, Wallingford, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 45 days.

(21) Appl. No.: 11/602,522

(22) Filed: Nov. 21, 2006

(65) Prior Publication Data

US 2007/0186670 A1    Aug. 16, 2007

Related U.S. Application Data

(60) Provisional application No. 60/738,452, filed on Nov. 21, 2005.

(51) Int. Cl.
*G01D 1/16*    (2006.01)
(52) U.S. Cl. .............................. 73/789; 73/790; 73/791; 73/795

(58) Field of Classification Search .................. 73/789, 73/790, 791, 795
See application file for complete search history.

(56) References Cited

U.S. PATENT DOCUMENTS

| | | | | |
|---|---|---|---|---|
| 4,140,008 | A * | 2/1979 | Golembeck et al. | 73/78 |
| 5,074,983 | A | 12/1991 | Eltoukhy et al. | |
| 5,255,562 | A | 10/1993 | Yamamoto et al. | |
| 5,299,450 | A * | 4/1994 | Nakagawa et al. | 73/78 |
| 5,377,289 | A | 12/1994 | Johnson et al. | |
| 5,517,860 | A | 5/1996 | Lin et al. | |
| 6,050,138 | A * | 4/2000 | Lynch et al. | 73/150 A |
| 6,321,594 | B1 * | 11/2001 | Brown et al. | 73/150 A |
| 6,393,898 | B1 * | 5/2002 | Hajduk et al. | 73/54.05 |
| 6,520,004 | B1 * | 2/2003 | Lin | 73/81 |
| 6,679,130 | B2 * | 1/2004 | Hajduk et al. | 73/866 |
| 6,736,017 | B2 * | 5/2004 | Mansky | 73/862.046 |
| 7,112,443 | B2 * | 9/2006 | Hajduk et al. | 436/5 |

* cited by examiner

*Primary Examiner*—Edward Lefkowitz
*Assistant Examiner*—Freddie Kirkland, III
(74) *Attorney, Agent, or Firm*—Sudhir G. Deshmukh

(57) ABSTRACT

This invention is directed to the measurement of stress-strain relationships in thin films using substantially flat, parallel test surfaces with minimal width. This invention is further directed to the measurement of stress-strain relationships in thin films at controlled temperatures and at high strain rates above 100% per second.

12 Claims, 7 Drawing Sheets

MECHANICAL PROPERTY MEASUREMENT OF THIN FILMS BY MICRO PLANE-STRAIN COMPRESSION

CROSS-REFERENCE TO RELATED APPLICATION

This application claims priority under 35 U.S.C. §119 from U.S. Provisional Application Ser. No. 60/738,452, filed Nov. 21, 2005.

BACKGROUND OF THE INVENTION

1. Field of the Invention

This invention is directed to a method for the measurement of stress-strain relationships in thin films using substantially flat and parallel test surfaces with minimal width. This invention is particularly directed to a method for the measurement of stress-strain relationships in thin films with a thermo control means for temperature dependent measurements and to an apparatus for making the measurement.

2. Description of the Related Art

A wide variety of techniques have previously been used in the measurement of mechanical properties of thin films. Tensile tests are well-established and most-acceptable tests for measuring in-plane properties of thin films. However, the in-plane properties can be different from out-of-plane properties, and it is the latter which are often more relevant to the performance of the films in their intended applications. In addition, tensile experiments impose tensile stresses on samples, which promote fracture failure earlier in the deformation, and may mask observations of plastic flow. In addition, areas supporting the load in tensile tests decrease as loads increase, leading to instability with necking and non-uniform straining. As a result, reliable large-strain properties cannot be obtained from tensile tests.

Representative of the aforementioned tensile tests is bulge testing, which is a biaxial tensile test. There, both stresses and strains can only be roughly estimated through mathematical modeling because of the complex geometry of deformation.

Nano-indentation testing is a widely-used technique to study the mechanical properties of thin films. While simple in operation, expensive equipment has been required, and the non-uniform deformation results in complicated stress and strain fields, and also makes understanding and interpreting the measurements difficult. Even with the help of sophisticated computational models, no stress-strain relationships can be extracted from nano-indentation measurements.

In addition, methods mentioned above can not provide mechanical property information of thin films under higher strain-rate, i.e., a strain-rate greater than 100% per second.

An improved test and an apparatus were disclosed in U.S. Pat. No. 5,517,860, wherein stress-strain relationships for thin films can be measured in a plane-strain compression condition. The aforementioned U.S. Patent is herein incorporated by reference. However, the method and the testing apparatus provided by the aforementioned patent can only measure stress-strain relationships under strain rates up to about 100 per second (100% per second). Although it is a few orders of magnitude higher than conventional tensile tests which can only measure stress-strain relationships of thin films under strain-rates in a range from $10^{-3}$ to $10^{-1}$ (0.1 to 10%) per second, the strain-rate applied by the method and the testing apparatus provided by the aforementioned patent is still far below the strain rates expected in a real impact situation which is usually in a range of $10^2$ (10,000%) per second or higher. It is therefore still in need for a testing method and an apparatus that can measure mechanical properties of thin films in strain rates close to the real impact situation. In addition, there are also needs to obtain film mechanical properties at temperatures other than ambient temperatures.

SUMMARY OF THE INVENTION

The present invention provides an improved testing apparatus and method which enables uniform measurements of stress-strain relationships for thin films in the out-of-plane direction to large strain deformation under a wider range of controlled thermal conditions and with higher strain rates close to the real impact situation.

Specifically, the present invention provides a testing apparatus for determining the stress-strain relationship in a film comprising:

(a) a first and a second substantially flat test surfaces between which the film is placed for testing, the flat test surfaces each having a substantially linear configuration and in substantially complete alignment and wherein the width of each test surface is at least equal to the thickness of the film and no greater than twice the thickness of the film;

(b) a position means for positioning the test surfaces substantially parallel to each other;

(c) a displacement means for moving one of the test surfaces with respect to the second test surface; and (d) a thermal control means for modulating temperatures of the film and the test surfaces;

wherein the position means for positioning at least one of the test surfaces is a double cantilever structure onto which one test surface is attached.

The apparatus of the instant invention further comprises an insulation means.

DETAILED DESCRIPTION OF THE INVENTION

Figure 1:
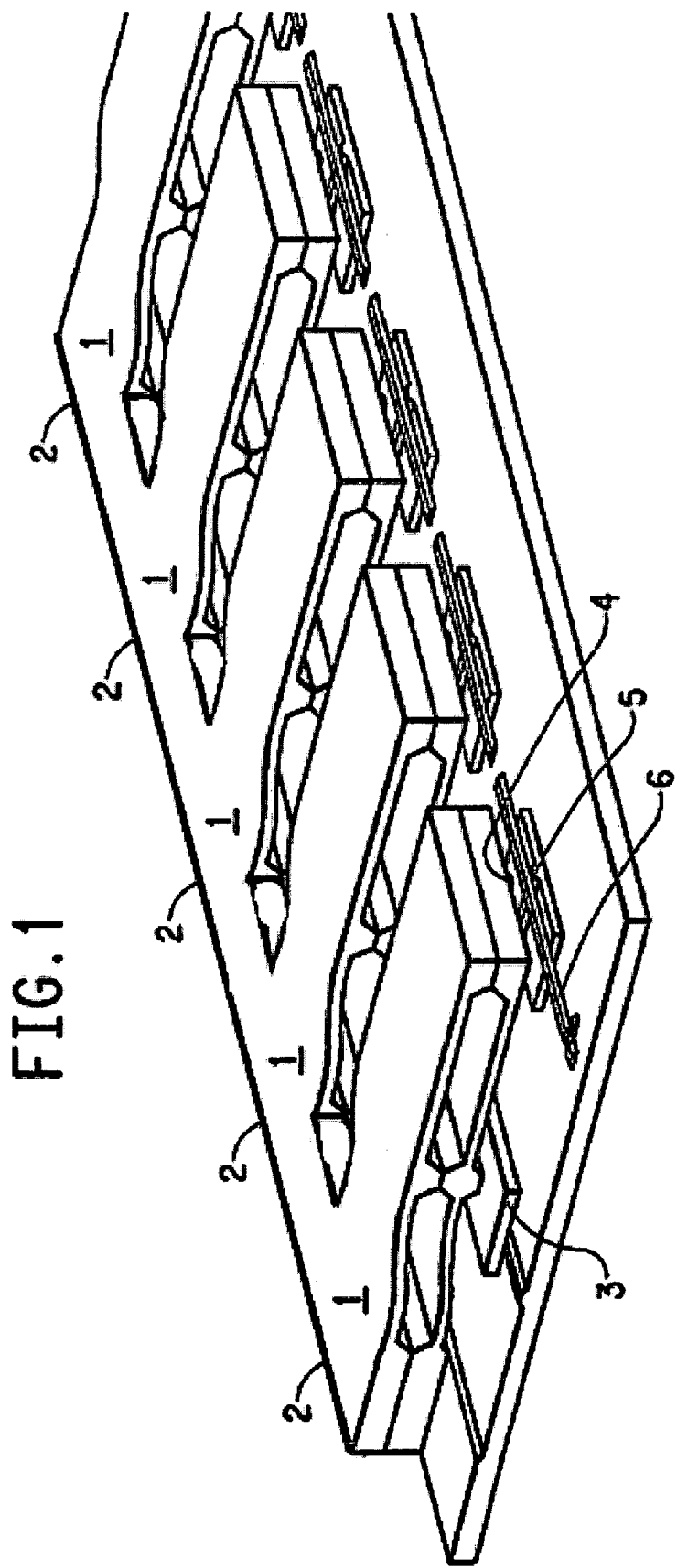
FIG. 1 is a schematic representation of an apparatus of the present invention.

The present invention is applicable to the measurement of properties in thin films. Thin films, as used herein, are understood to mean unsupported planar structures having a thickness of about from 1 to 1000 microns.

A central element of the present invention is the provision of two substantially flat test surfaces, a first and a second substantially flat test surfaces, between which the film is placed for testing, a position means for positioning the test surfaces substantially parallel to each other and in alignment, a displacement means for deforming a sample, and a thermal control means for modulating the temperature of the film and the test surface to a temperature higher or lower than an ambient environment temperature.

The test surfaces used in the present invention are substantially flat and substantially parallel. By substantially flat is meant that the surface variation of the width of the anvil is less than about 30 nm. Test surfaces having the required degree of flatness can be prepared from a variety of materials. However, silicon crystal has been found to be particularly satisfactory because of its crystalline structure. By forming the test surface, or anvil, from a single crystal, an exceptionally high degree of flatness can be obtained, since such surfaces can be a crystallographic plane, and accordingly flat on an atomic level. Silicon crystal also has excellent mechanical properties, and exhibits substantially no hysteresis. In addition, because of its anisotropic properties, silicon can be micromachined with great precision. An additional important element of the present invention is that the upper and lower anvils be substantially in alignment. Specifically, any misalignment between the two anvils should generally be less than about 2 microns. Alignment can be measured, for example, according to the techniques described in detail in Johnson et al. U.S. Pat. No. 5,377,289.

The flat test surfaces are basically knife-like in configuration, but the test surface, or anvil, is flat rather than a cutting edge. Accordingly, the test surfaces are said to have a substantially linear configuration. The width of each test surface is at least equal to the thickness of the film being tested, and no greater than twice the thickness of the film. Within this range, edge effect and the effect of surface friction in the testing have little influence on the test results.

The width of the sample is preferably substantially greater than the width of the anvil. This assures that the deformation will be in a two-dimensional plane-strain condition.

The substantially parallel configuration of the test surfaces can be obtained by the preferred double cantilever design. Using such a construction, an embodiment of the position means for positioning the test surfaces substantially parallel to each other, the integral anvils can be positioned parallel before and during the test period. The cantilever beams can be prepared from a variety of materials. However, a unitary structure of silicon is similarly preferred for the beams.

The invention will be more fully understood by reference to the drawings, in which FIG. 1 is a schematic perspective view of an apparatus of the invention. There, dual double-cantilevered beams 1, anchored at their proximal ends 2, are positioned over shims 3. Anvils 4 and 5 are integral with the distal ends of the beams, and positioned to impinge on sample 6. In this illustration, a single, continuous sample is used for all test surfaces. However, separate samples for each test surface can also be used. The surfaces of the anvils 4 and 5 that are in contact with the testing sample provide the first and the second substantially flat compression surfaces.

Figure 2:
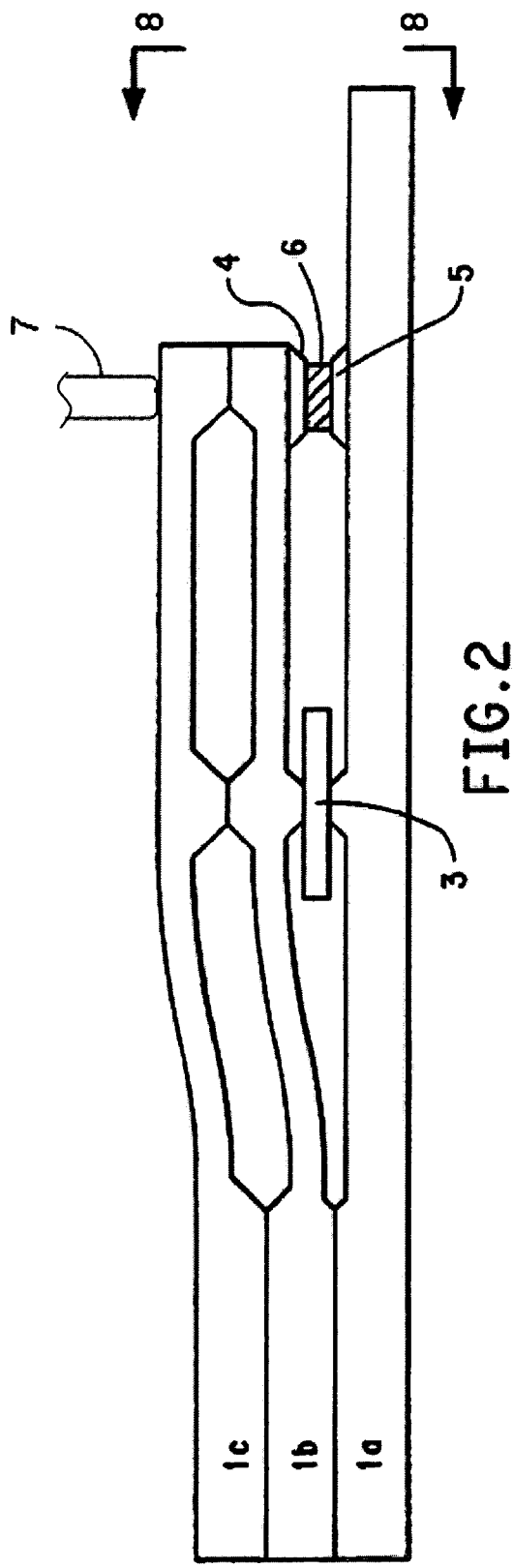
FIG. 2 is a cross-sectional schematic representation of a detail of an apparatus of the invention.
Figure 3:
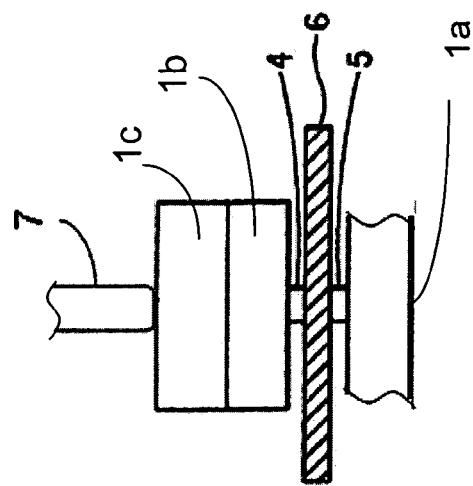
FIG. 3 is a representation of a portion of the apparatus, viewed from the viewing angle 8 as illustrated in FIG. 2.

As shown more clearly in FIG. 2, the dual double-cantilevered beams are typically composed of a base portion 1a, a middle portion 1b, and an upper portion 1c. These portions, preferably fabricated from a unitary crystal as discussed above, can be formed into the desired configuration by customary microfabrication techniques, as are well known to those skilled in the art. In the course of such fabrication, the anvil portions which come into contact with the sample are formed. After microfabrication, the components of the cantilever beam are assembled by suitable techniques such as, fusion bonding. As illustrated more clearly in FIG. 3, which represents a view from the viewing point 8 as illustrated in FIG. 2, the anvils 4 and 5 have a substantially linear configuration, and the cross-section of the anvil is rectilinear, to provide the flat surface which comes into contact with the sample 6. A probe 7 delivers a load to the anvil 4.

The shims used to aid in the parallel alignment of the two test surface can be prepared from a wide variety of materials, which can be the same or different than the material from which the cantilever is prepared. It has been found particularly satisfactory, however, to use shims prepared from metal or metal alloys, such as, stainless steel.

In order to measure the mechanical property at temperatures other than an environment temperature, modulations of temperature at the testing surfaces are desired. The environment temperature is the temperature of the general area where the test apparatus is located. The environment temperature may the room temperature of the room where the test apparatus is located. Increasing or decreasing temperature to a thin film such as, the ones used in the test has been a major challenge in the industry. The film and the anvil are fragile and difficult to deliver thermal energy to them without affecting testing measurements. In this invention, the thermo control means is provided to increase or decrease the temperature at a test area including the test surfaces of the anvil and the film sample. The test area may include more than one set of the anvils and the samples.

Figure 4:
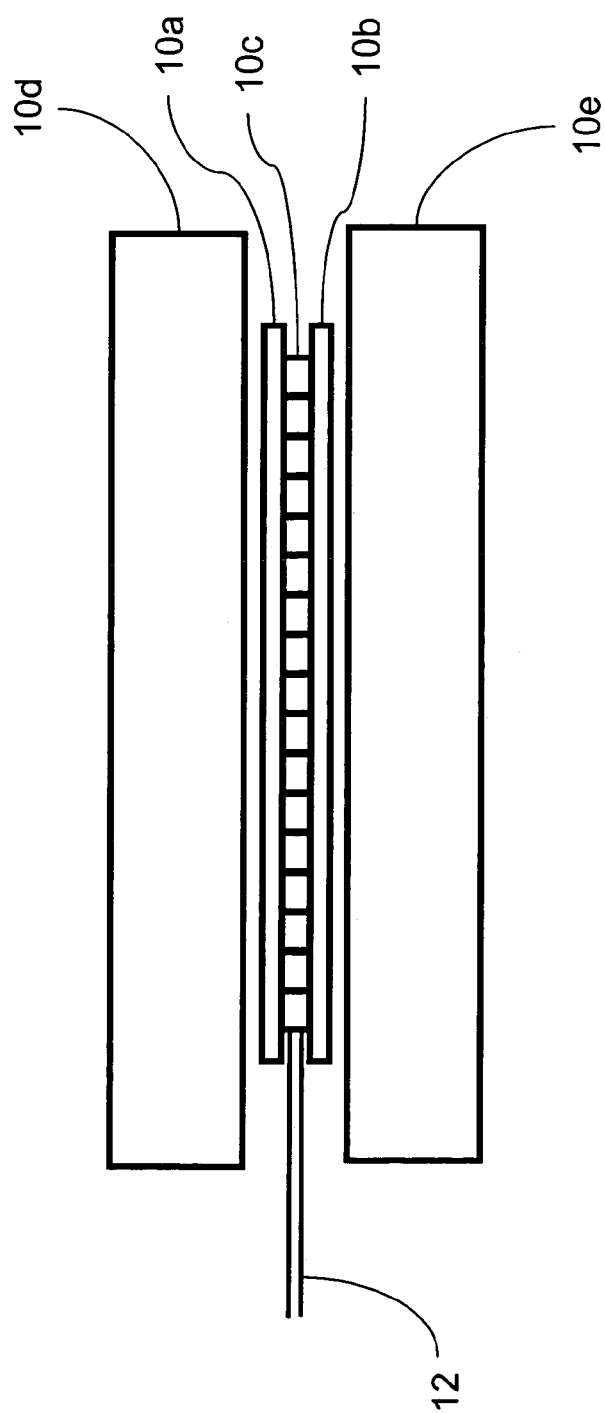
FIG. 4 is a cross-sectional schematic representation of a thermoelectric heating and cooling device (THCD). Two pieces of optional thermo sink are shown.

One embodiment of the thermo control means is a thermoelectric heating and cooling device (THCD) manufactured by the Melcor Corporation (Trenton, N.J. 08648, USA). As illustrated in FIG. 4, the THCD has two surfaces, a heating surface 10a and a cooling surface 10b, and a thermoelectric component 10c positioned between two surfaces. A set of connection wires 12 provides the THCD with electric current supply and control. An optional thermo sink 10d may be placed to be in direct contact with one surface of the THCD to provide more efficient and uniform thermo transfer. A second piece of thermo sink 10e may be placed to be in direct contact with the other surface of the THCD. The thermo sink may be made of a flat metal block, such as, a copper block. The thermo sink may in the similar or different size compared to the THCD surfaces. The two pieces of the thermo sink 10d and 10e may be made of same or different materials, and/or in same or different shapes as commonly known to the industry. When supplied with a directional electric current to the thermoelectric component 10c via the set of connection wires 12, the THCD can produce heat at the heating surface while cool at the cooling surface. The temperature difference between the two surfaces may reach 65° C. or higher depending on the electric current supplied. The heating and the cooling surfaces can be reversed by reversing the direction of the directional electric current.

Figure 5A:
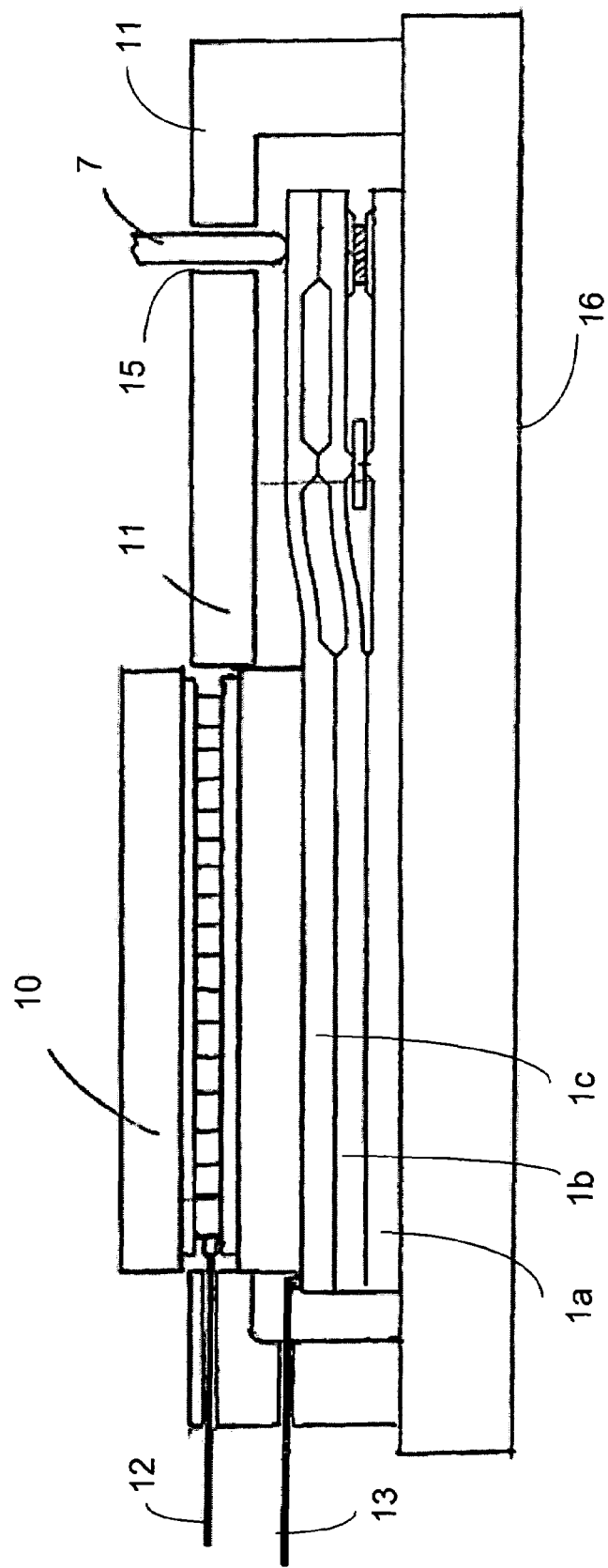
FIG. 5A is a schematic representation of the testing apparatus with a thermo control means and an insulation means of this invention.

The testing apparatus of this invention may be better understood with a representative illustration shown in FIG. 5A. The thermo control means 10 is configured in such a way that one surface (the first THCD surface) of the THCD is in direct contact with the cantilevered beams while the second surface is facing away from the test area. The second THCD surface may be exposed to the air or in direct contact with a second set of THCD or a thermo medium. Suitable thermo medium may include a circulating air, a metal thermo plate, a water-mediated heat exchanger or an oil-mediated heat exchanger or other thermo exchanging devices. The first THCD surface may be the heating or the cooling surface as desired. Since the THCD is capable of generating temperature difference between the two surfaces, when the thermoelectric component is appropriately supplied with an electric current, increase of the temperature at the second THCD surface can help to further increase the temperature of the first THCD surface, while reducing the temperature at the second THCD surface can help to result in a further decrease of the temperature of the first THCD surface. One or more pieces of the thermo sink may be optionally placed in direct contact with one or more THCD surfaces, or between the THCD surface and the thermo medium.

Temperatures at the test area can be measured by a resistance temperature detector (RTD, not shown in FIG. 5A) via a set of RTD wires 13. With the resistance temperature detector (RTD) and a RTD controller, which are supplied by Wavelength Electronics (Bozeman, Mont. 59715, USA), forming a closed-loop feed-back control system with the THCD, a temperature difference of up to ±50° C. between the ambient temperature and the test surfaces can be reached with a single THCD.

To achieve a temperature at the test area more than 50° C. higher than the ambient environment, two THCDs may be stacked in such a way that the heating surface of a first THCD is in contact with the cantilevered beams while the cooling surface of the first THCD is in contact with the heating surface of a second THCD whereas the cooling surface of the second THCD is facing the environment or the thermo medium. With two THCDs stacked as described above, the temperature at the test surface can reach to about +100° C. above the ambient environment. The heating and the cooling surfaces of the THCD may be reversed by simply reversing the direction of electric current going through the THCD as described by the manufacturer. With one THCD, the temperature of the test surface can reach about −25° C. in about 15 minutes when the ambient environment temperature is at about 20° C. Two THCDs may be stacked in the way described above to achieve a temperature lower than −30° C. Additional THCDs may be stacked to achieve a temperature reaching −50° C. or lower.

Although the THCD is selected as an embodiment of the thermo control means, a person skilled in the art may choose to use other thermo control devices or methods without departing from the spirit of the instant invention. Some suitable. thermo control devices or methods may include, but not limited to, an electric resistance heating device, an infrared heating device, a laser heating device, a hot air heating device, a refrigerating device, a dry ice cooling device, a liquid ice cooling device, or a liquid nitrogen cooling device.

Figure 5B:
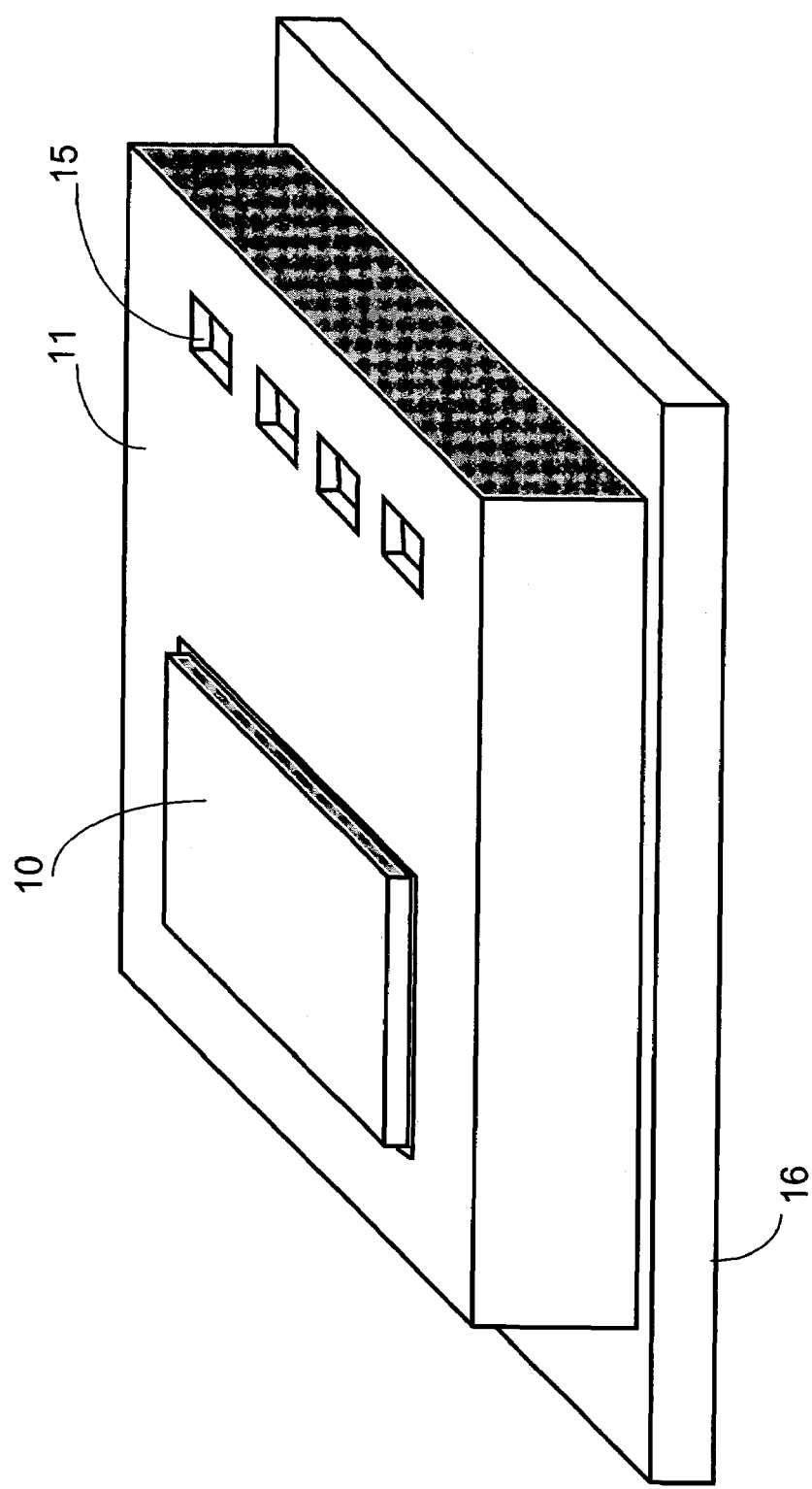
FIG. 5B is a schematic representation of the testing apparatus viewed from outside of an insulation chamber.
Figure 5C:
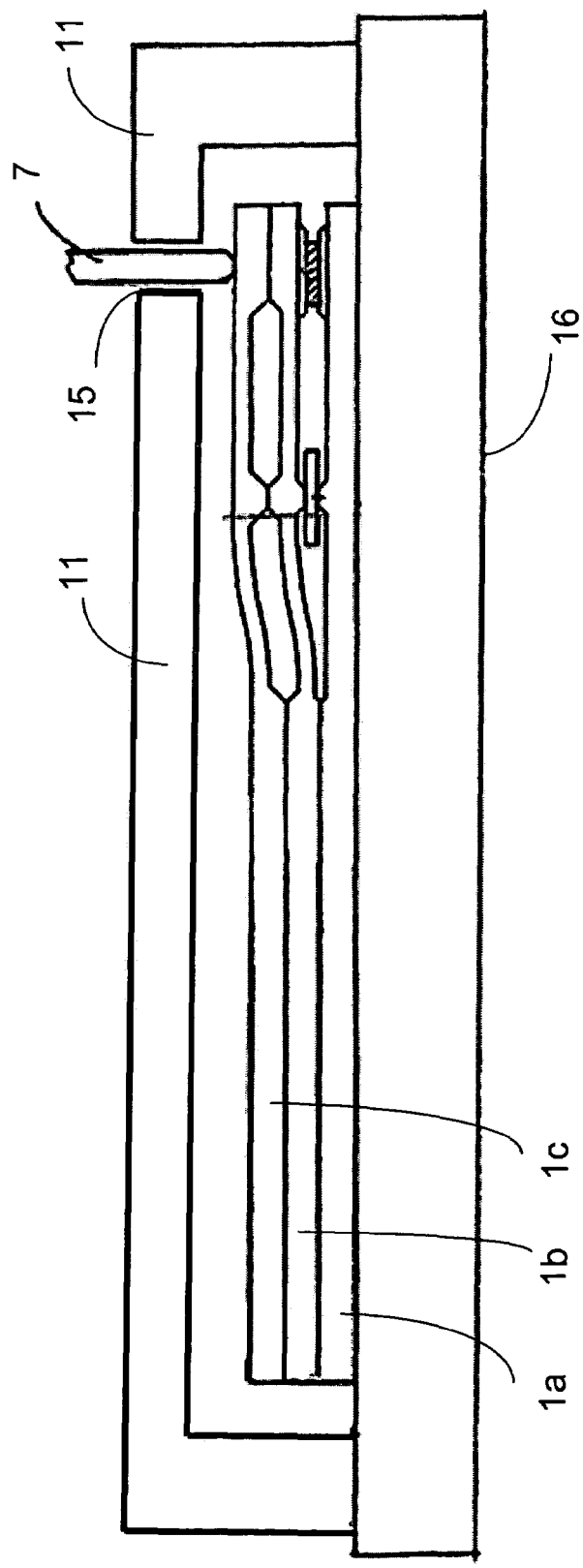
FIG. 5C is a cross-sectional schematic representation of the testing apparatus with an insulation chamber.

This invention further provides an insulation means (11) to insulate the test area from its environment. A suitable insulation means may be a chamber that covers the test area including the anvils and the thin films as illustrated in FIG. 5A, 5B and 5C. The insulation means is useful when the temperature of the test area is desired to be different from the environment. The insulation means also keeps other undesired environmental effects away from the test area. Some of the undesired environmental effects include, but not limited to, dust, debris, air movement, and undesired mechanical disturbances, such as, accidental touching of the test sample by an object other than the probe 7.

The insulation means can be configured to allow the second THCD surface to be in direct contact with the environment or the thermo medium as described above so the THCD may generate a desired temperature at the first THCD surface that is in contact with the cantilever beams. The optional thermo sink may be placed between the first THCD surface and the cantilever beams. In one embodiment, the chamber is made of a plastic material and in contact with a base plate 16 in such a way that the test area is enclosed between the chamber and the base plate and one surface of the THCD is exposed to the environment as illustrated in FIG. 5A and 5B. The insulation means can also be configured to enclose the entire test area when the THCD is present (FIG. 5C). An access opening 15 can be provided to allow for the probe 7 to reach the anvils in either embodiment. The access opening may be configured to fit configurations of the anvils. The access opening may be in different shapes, such as, oval, circular, rectangle, or square, or different sizes, such as, one opening for one anvil or one opening for multiple anvils. A person skilled in the art may choose to design and manufacture the insulation means in different shapes and with different materials without departing from the spirit of the instant invention. Some suitable designs may include, but not limited to, a multi-piece chamber allowing easy access to the test area, a sliding chamber that can be moved out of and back to the test area and a multi-compartment insulation to allow different thermo control of individual or a group of anvils or samples. The insulation means may be made of a single or multi-layers of a single or combinations of different materials. Suitable materials for the insulation means may include, but not limited to, plastics, glasses, composite materials, conventional thermo insulation materials, and combinations thereof.

High strain-rate mechanical property is very important information but very difficult to measure. One of the major advantages of the micro-plane strain compression test over the tensile test is that a higher strain-rate deformation can be achieved. This is due to the fact that a compression thickness of the micro-plane strain compression test is at less 2 orders of magnitude smaller than a gage length of the tensile sample. With the thin films used in the micro-plane strain compression test, high strain rates can be achieved without the need for high velocity. For example, in order to reach a strain rate of 100,000% (or $10^3$) per second, an initial cross head velocity, equivalent to the probe velocity in the micro-plain strain compression test, needs to be at 50,000 mm/s for a tensile test with a gage length of 50 mm. This level of cross head velocity is very difficult to obtain with current tensile test instruments. To reach the same 100,000% per second strain rate, the velocity of the probe in the micro-plain strain compression tests only needs to be at 50 mm/s with a sample having a thickness of 50 micrometer. This velocity is within a velocity range of current technologies. To reach an even higher strain rates, a thinner film may be used in the micro-plain strain compression tests. When a film of 5 micrometer in thickness is used, the strain rate can reach 1,000,000% ($10^4$) per second. Remaining problems for obtaining high strain-rate mechanical property are 1) generating and delivering well-defined motion up to a few hundreds of millimeters per second to the thin film without causing damage to the anvil, and 2) measuring and recording relevant data at a high rate. This invention resolved these problems by providing 1) the cantilever beam based anvil system capable of measuring thin films having a thickness in a range from 1 to 1000 micrometer, and 2) a data acquisition means capable of acquiring data at a rate higher or equal to 1,000,000 sample points per second.

Figure 6:
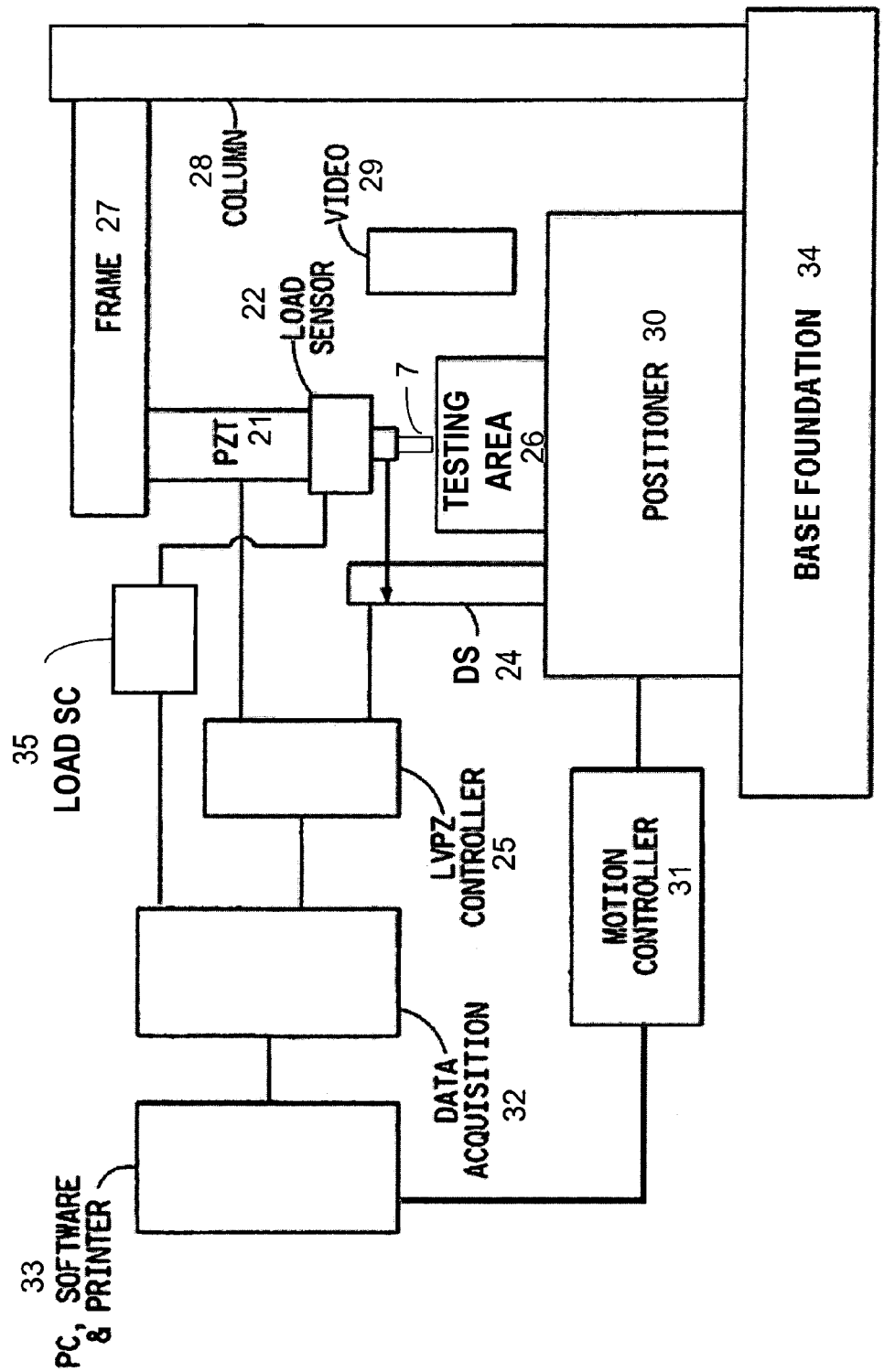
FIG. 6 is a schematic representation of the components used for converting the electronic signals generated in the course of the testing to a visual or graphic form.

FIG. 6 illustrates an operation of the improved testing apparatus and a supporting system. In this embodiment, a displacement means comprises a piezo actuator 21, a load sensor 22, and a probe 7. A directional displacement motion at a desired velocity is generated by the piezo actuator 21 based on signals from a load signal conditioner (SC) 35 and is delivered to an upper test surface (the anvil 4—See FIGS. 2 & 3) through the load sensor 22 and the probe 7, to contact and deform the sample within the testing apparatus. For accurate measurement of the properties of the thin samples, the displacement of the test surface or the anvil should be precisely controlled, to permit recording of changes in a range of nanometers. Current technology of the piezo actuator 21 can reach a level that the displacement can be controlled with a sub-nanometer resolution. The displacement means provided by the present invention is suitable for testing a strain rate up to 1,000,000% per second. The piezo actuator can reach its nominal displacement in approximately one third of the period of its resonant frequency. The resonant frequency of an industrial-reliable piezo actuator can be as high as about 3-40 kHz. In addition, the piezo actuator can produce accelerations more than 10,000 times the gravity. In one embodiment, a piezo actuator with 10 kHz resonant frequency produces a directional motion at a velocity of about 50 mm/s, which is suitable for the micro plane-strain compression at a strain rate up to 1,000,000% per second with a film thickness of 5 micrometer or less as disclosed above.

The displacement can be measured by a capacitive displacement sensor (DS) 24 or a linear variable differential transformer (LVDT, not shown in FIG. 6), and the resulting electronic signal is transmitted to a low voltage piezo (LVPZ) controller 25 to form a closed loop control. The force required for the deformation is measured by the load sensor 22 to produce an electronic signal, along with the displacement of the test surface. The load sensor 22 measures the resistance of the thin film sample to the displacement delivered through the probe 7. The electronic signals from a load signal conditioner (SC) 35 to the load sensor 22 and the displacement sensor (DS) 24 are collected by a data acquisition means 32, which converts the analog signals to digital signals. These signals, in turn, are transmitted to a computer 33 for storage, display and processing. A suitable data acquisition means can be a high-speed data acquisition board with a sampling rate faster than 1,000,000 sample points per second.

Components of the apparatus and the system may be selected from commercial sources. For example, Physik Instrumente L.P, (76228 Karlsruhe, Germany), provides the piezo actuator, controllers, sensors and signal conditioners with bandwidths and resonant frequencies suitable for the range of strain rates described in this invention. Another commercial provider is National Instrument (Austin, Tex., USA) which provides the suitable data acquisition boards with a sampling rate faster than 1,000,000 sample points per second. The load signal conditioner (SC) 35 for load measurement may be integrated in the data acquisition board 32. A displacement signal conditioner (not shown in FIG. 6) may be used and may be integrated in the LVPZ controller 25.

The overall apparatus and the method further comprise conventional components selected to provide the precise control of motion and measurement of the deformation. Such a driving and probing system can include, for example, commercially available apparatus of the types noted. Components of the supporting system may be selected from conventional sources by a person skilled in the art. The system may include a frame 27 and a column 28 to position the piezo actuator (PZT) 21 and associated sensors over a base foundation 34. The system may further comprise a video device 29 to record the measurement process. The system may even further comprise a positioner 30 and a motion controller 31 to accurately and automatically position the testing area 26 in relation to the probe 7.

Running time of the test can depend on the rate of deformation of the sample. Overall time to complete a test including loading a sample is about ten minutes. Software can be programmed to create a step change in the rate of deformation. During the test, the deformation is computer controlled, with a feedback loop that assures precision application of accurately measured displacement. Force is measured through a mode sensor simultaneously. The information is fed directly into a computer where the information is recorded. The program monitors and measures the amount of force at displacement. The data can be analyzed immediately or stored for later review. This makes it possible to take measurements of a series of samples at the same time, permitting the data analysis at a later time. Similarly, a change of the rate of deformation during the test procedure provides additional information about the behavior of the sample during the changes in conditions.

The load displacement data is corrected for system stiffness and compliance of the anvil, and then converted to a stress-strain curve in an appropriate form.

The instant invention is applicable to a wide variety of thin film materials, including coating materials such as, those used, for example, in automotive applications, and various polymeric films, such as, polyolefins, polyamides, polyamides and polyesters, as well as spunbonded sheets.

The present invention provides a flexible and adaptable means for the study of the intrinsic mechanical properties of thin film materials, providing the ability to quickly and accurately determine the properties that effect performance of the materials in thin film form. The uniform deformation of the samples in the present invention, through the use of the flat test surfaces, their size, parallel arrangement and alignment, permits precise measurement of deformation and calculation of the stress-strain relationship.

What is claimed is:

1. A testing apparatus for determining the stress-strain relationship in a film comprising:
   (a) a first and a second substantially flat test surfaces between which the film is placed for testing, the flat test surfaces each having a substantially linear configuration and in substantially complete alignment and wherein the width of each test surface is at least equal to the thickness of the film and no greater than twice the thickness of the film;
   (b) a position means for positioning the test surfaces substantially parallel to each other;
   (c) a displacement means for moving one of the test surfaces with respect to the second test surface; and
   (d) a thermal control means for modulating temperatures of the film and the test surfaces comprise a heating surface and a cooling surface having a thermoelectric component positioned between said surfaces;
wherein the position means for positioning at least one of the test surfaces is a double cantilever structure onto which one test surface is attached.

2. The apparatus of claim 1, wherein the displacement means for moving one of the test surfaces with respect to the second test surface is capable of delivering a displacement velocity to the test surfaces to achieve a strain rate ranging from $10^0$ to $10^4$ (100% to 1,000,000%) per second.

3. The apparatus of claim 1 further comprising an insulation means.

4. The apparatus of claim 1, wherein the thermal control means is capable of generating a temperature at the test surfaces in a range from −50° C. to +150° C.

5. The apparatus of claim 1, wherein the thermal control means is capable of generating a temperature at the test surfaces in a range from −50° C. to 0° C.

6. The apparatus of claim 1 wherein each test surface has a surface variation of less than about 30 nm.

7. The apparatus of claim 6 wherein each of the test surface comprises a single crystal.

8. The apparatus of claim 7 wherein at least one of the test surfaces consists essentially of silicon.

9. A method for determining the stress-strain relationship in a film of comprising the steps of:

(a) placing the film between a first and a second substantially flat test surfaces for testing, the flat test surfaces each having a substanstially linear configuration and wherein the width of each test surface is at least equal to the thickness of the film and no greater than twice the thickness of the film;

(b) positioning the test surfaces substantially parallel to each other;

(c) modulating temperatures of the film and the test surfaces by a heating surface and a cooling surface of thermal control means having a thermoelectric component postioned between said surfaces;

(d) moving one of the test surfaces toward second test surface to compress the film; and (e) measuring the force required to compress the film; wherein the test surfaces are positioned substantially parallel by means of a double cantilever structure onto which one test surface is attached.

10. The method of claim 9, wherein the temperatures at the test surfaces is modulated to a range from −50° C. to +150° C.

11. The method of claim 9, wherein the temperatures at the test surfaces is modulated to a range from −50° C. to 0° C.

12. The method of claim 9, wherein each test surface has a surface variation of less than about 30 nm.

* * * * *